United States Patent [19]

Toshiichi

[11] Patent Number: 4,648,463
[45] Date of Patent: Mar. 10, 1987

[54] WEEDER FOR REMOVING WEEDS HAVING VARIOUS LENGTHS

[76] Inventor: Sugiyama Toshiichi, No. 25-25, Fujioka 5-chome, Fujieda, Shizuoka, Japan, 426

[21] Appl. No.: 661,174

[22] Filed: Oct. 15, 1984

[51] Int. Cl.[4] ................... A01D 45/00; A01D 45/30; A01D 46/18
[52] U.S. Cl. .................... 171/61; 171/62; 56/327 R
[58] Field of Search .............. 171/28, 29, 36, 38, 171/39, 41, 56, 58, 59, 60, 61, 62; 56/126, 153, 327 A, 327 R

[56] References Cited

U.S. PATENT DOCUMENTS

| 1,004,523 | 9/1911 | Asbell | 171/60 |
|---|---|---|---|
| 1,190,598 | 7/1916 | Seierup | 171/61 X |
| 1,410,420 | 3/1922 | Stedman | 171/60 X |
| 2,197,225 | 4/1940 | Pierson | 171/61 X |
| 2,528,806 | 11/1950 | Walz et al. | 171/61 X |
| 3,521,710 | 4/1966 | Tillotson | 171/61 |
| 3,678,677 | 7/1972 | Miller et al. | 56/327 R |
| 3,833,065 | 9/1974 | Hamminga | 171/61 X |
| 4,219,991 | 9/1980 | Bray | 171/58 X |
| 4,455,814 | 6/1984 | Kienholz | 56/126 |

FOREIGN PATENT DOCUMENTS

| 21381 | 6/1961 | Fed. Rep. of Germany | 171/36 |
|---|---|---|---|
| 1022599 | 3/1953 | France | 171/60 |
| 99131 | 9/1961 | Netherlands | 171/61 |
| 225610 | 12/1968 | U.S.S.R. | 56/153 |
| 745421 | 7/1980 | U.S.S.R. | 171/61 |
| 965389 | 10/1982 | U.S.S.R. | 171/61 |

Primary Examiner—Robert A. Hafer
Assistant Examiner—Terrence L. B. Brown
Attorney, Agent, or Firm—Brumbaugh, Graves, Donohue & Raymond

[57] ABSTRACT

A weeder for removing weeds in a golf course or the like has: a body to be moved along a ground surface; a weeding unit arranged such that a first winding transmission member mounted on the body has weed fetch rods arranged at predetermined intervals; a drive unit for driving the first winding transmission member; and a gripping unit consisting of a second winding transmission member brought into contact with the weeding unit mounted on the body, whereby a lowest contact line between the weeding unit and the gripping unit is defined as a start line of a contact start plane, and the start line is located in the vicinity of the ground surface. Cutters are mounted on each weed fetch rod of the weeding unit in a comb-like manner. The top of each cutter is located inside the top of the weed fetch rod when the weed fetch rod is rectilinearly moved. However, when the weed fetch rod is moved along an arcuated locus, the top of each cutter extends outside the top of the weed fetch rod.

12 Claims, 6 Drawing Figures

WEEDER FOR REMOVING WEEDS HAVING VARIOUS LENGTHS

BACKGROUND OF THE INVENTION (1) Field of the Invention

The present invention relates to a weeder for removing weeds in a golf course.

(2) Description of the Prior Art

The present applicant proposed a mechanical weeder in place of manual weeding, in Japanese Utility Model Publication No. 3688/1984. This prior weeder has a weeding cylinder and a gripping roller driven upon rotation of the weeding cylinder. The weeding cylinder is rotated to grip the upper portions of weeds and pulls the weeds in cooperation with the gripping roller. According to this conventional weeder, the weeds are pulled at a contact line between the weeding cylinder and the gripping roller, so that the contact line becomes higher than the ground surface due to a construction limitation of the weeder. For this reason, short weeds cannot be pulled. In addition to this disadvantage, the gripped weeds are also pulled by their upper portions and cannot be pulled by their roots. The gripped weeds are often cut at intermediate portions thereof. Furthermore, the pulled weeds become entangled in the gripping roller, resulting in inconvenience.

SUMMARY OF THE INVENTION

It is a first object of the present invention to eliminate the conventional drawbacks described above and to provide the weeder wherein a weed pulling position is closer to the ground surface so as to remove even short weeds, a contact surface between week clampers is increased to increase a weeding force acting on the weeds for a longer period of time, and entanglement of the gripping roller by the removed weeds is eliminated.

It is a second object of the present invention to provide a weeder wherein the weeds are aligned and bundled before they are pulled, and a cutter for cutting small roots is provided to effectively pull the weeds including roots.

In order to achieve the above objects of the present invention, there is provided a weeder comprising: a body to be moved along a ground surface; a weeding unit arranged such that a first winding transmission member mounted on said body has weed fetch rods arranged at predetermined intervals; a drive unit for driving said first winding transmission member; and a gripping unit consisting of a second winding transmission member brought into contact with said weeding unit mounted on said body, whereby a lowest contact line between said weeding unit and said gripping unit is defined as a start line of a contact start plane, and the start line is located in the vicinity of the ground surface. Cutters are mounted on each weed fetch rod of the weeding unit in a comb-like manner. The top of the cutters is located inside the top of the weed fetch rod when the weed fetch rod is linearly moved. However, when the weed fetch rod is moved along an arcuated locus, the top of the cutters extends outside the top of the weed fetch rod.

DETAILED DESCRIPTION OF THE PREFERRED EMBODIMENTS

Figure 1:
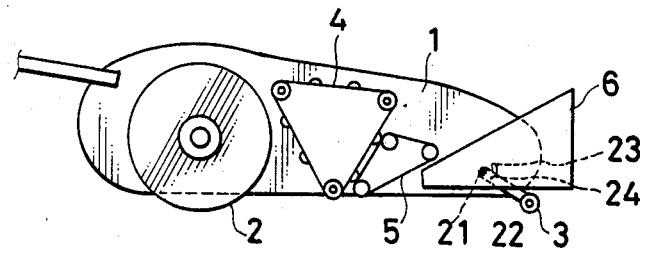
FIG. 1 is a sectional view schematically showing a weeder according to an embodiment of the present invention.

FIG. 1 is a sectional view schematically showing a weeder according to an embodiment of the present invention. Reference numeral 1 denotes a body supported by travel rollers 2 and 3 to move along the ground. The travel roller 3 is rotatably mounted at an end of a support arm 22 supported by a shaft 21. The support arm 22 is fixed by a fastening screw 24 inserted in an arcuated groove 23 having the shaft 21 at its center. When the fastening screw 24 is loosened, the travel roller 3 can be vertically moved with respect to the body 1. A box 6 is mounted in the body 1 to store weeds pulled by the weeding unit 4 and the gripping unit 5. The body 1 also has a transmission mechanism (not shown) such as belts, chains or gears. When the body 1 is traveling, rotation of the travel roller 2 is transmitted to the weeding unit 4 through the transmission mechanism. The weeding unit 4 is driven by the travel roller 2 to fetch or grip the upper portions of the weeds and pulls the weeds in cooperation with the gripping unit 5.

Figure 2:
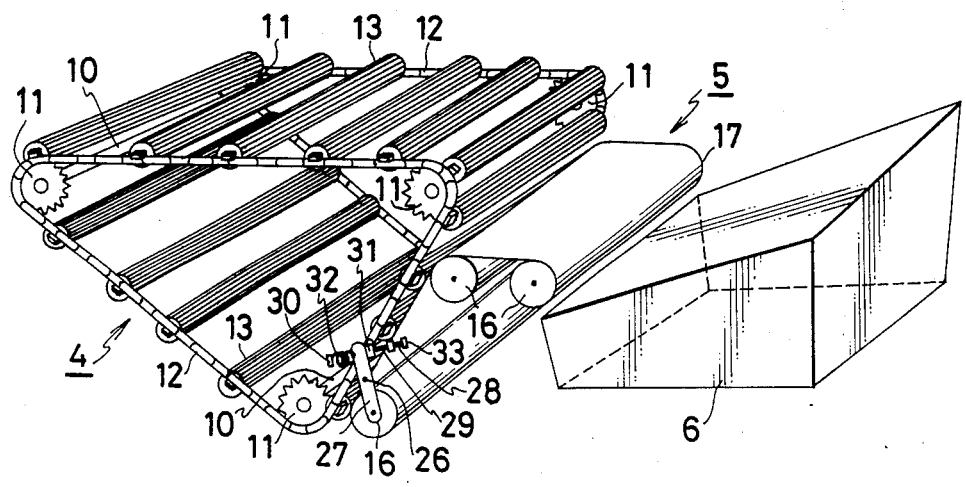
FIG. 2 is a perspective view showing a main part of the weeder shown in FIG. 1.

As shown in FIG. 2, the weeding unit 4 comprises at least two shafts 10, chain gears 11 mounted at two ends of each shaft 10, and weed fetch rods 13 mounted between chains 12 as the first winding transmission member at predetermined intervals. Each chain 12 is looped around chain gears 11 located at each side. Each weed fetch rod 13 comprises a core 14 constituting flat mounting portions 25 at its two ends and a rubber or plastic frictional member 15 having appropriate elastic and frictional properties and mounted on the outer surface of the core 14. The frictional member 15 has a cylindrical shape and has a plurality of ribs therearound along its longitudinal direction. The flat mounting portions 25 at two ends of each weed fetch rod 13 mesh with the corresponding chains 12.

As shown in FIG. 2, the gripping unit 5 comprises at least two rollers 16 rotatably mounted in the body 1 and a flat belt 17 as a second winding transmission member looped around the rollers 16. The flat belt 17 is driven in frictional contact with the frictional member 15. The flat belt 17 is made of a rubber material, a plastic material or a strong fabric which has the same elastic and frictional properties as those of the frictional member 15.

The lowest lines of the weeding unit 4 and the gripping unit 5 serve as a start line of the contact plane, and the start line is located in the vicinity of the ground surface.

The lowest roller 16 among at least two rollers in the gripping unit 5 is rotatably supported at one end of a support rod 27 mounted on the body 1 through a shaft 26. The support rod 27 is inserted through a compression spring 32 between a stopper 31 at the intermediate portion and a spring seat 30 at one end of an adjustable screw rod 29 threadably engaged with a mounting portion 28 in the body 1. When a head 33 of the adjustable screw rod 29 is rotated, the adjustable screw rod 29 extends or is withdrawn with respect to the body 1. The support rod 27 urged by the compression spring 32 against the stopper 31 of the adjustable screw rod 29 is pivoted about the shaft 26 to change a distance between the roller 16 and the weed fetch rod 13 and a contact pressure between the flat belt 17 and the weed fetch rod 13.

The operation of the weeder described above will be described hereinafter. When the body 1 is driven manually or is pulled by a powered vehicle, the travel roller 2 drives the chain gears 11. Upon rotation of the chain gears 11, the cores 14 secured to the chains 12 are driven along a path in which the chains 12 move. The frictional members 15 on the cores 14 fetch the weeds and pull the weeds in cooperation with the flat belt 17 in the gripping unit 5. The removed weeds are clamped between the frictional members 15 and the flat belt 17 and are moved upward. When the frictional member is separated from the flat belt, the weeds are conveyed on the flat belt and are stored in the box 6.

In this case, when a great amount of weeds, twigs, pebbles or the like is clamped between the frictional member 15 and the flat belt 17, the support rod 27 of the roller 16 is pivoted about the shaft 26 against the biasing force of the compression spring 32 counterclockwise in FIG. 2. In this case, the roller 16 is separated from the weed fetch rod 13, and no excessive force acts between the weed fetch rod 13 and the flat belts 17.

In this embodiment, the chain gears 11 in the weeding unit 4 are rotated upon rotation of the travel roller 2. However, a suitable motor may be mounted in the body 1, and the chain gears 11 may be rotated by this motor so as to drive the roller 2, thereby obtaining a self-propelled body 1.

The upper chain gear 11 at the side of the flat belt 17 is preferably used as a driving gear. This chain gear 11 may be coupled by a transmission mechanism such as a gear or a belt with the upper roller 16 located closest to the weeding unit 4. A pair of opposing rollers may be provided between the upper and lower chain gears 11 of the weeding unit 4 which are located near the gripping unit 5 and the upper and lower rollers 16 of the gripping unit 5 which are located near the weeding unit 4, thereby increasing a contact force between the flat belt 17 and the corresponding weed fetch rod 13.

Figure 3:
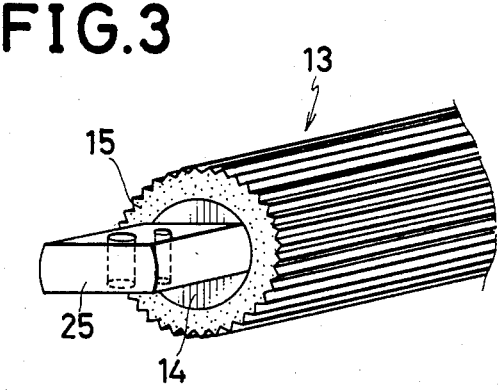
FIG. 3 is a perspective view partially showing the main part of the weeder shown in FIG. 1.
Figure 4:
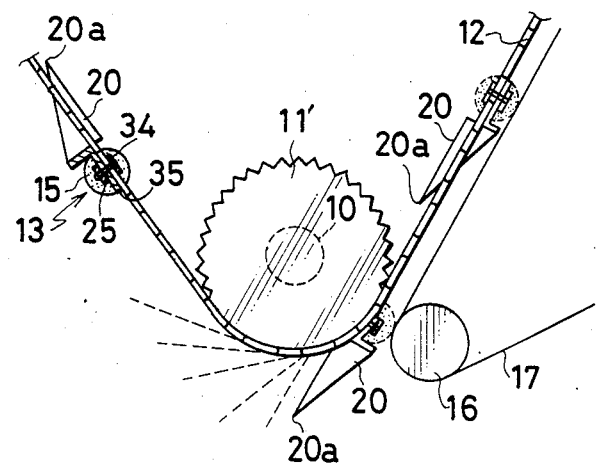
FIG. 4 is a sectional view of the main part of a weeder according to another embodiment of the present invention.
Figure 5:
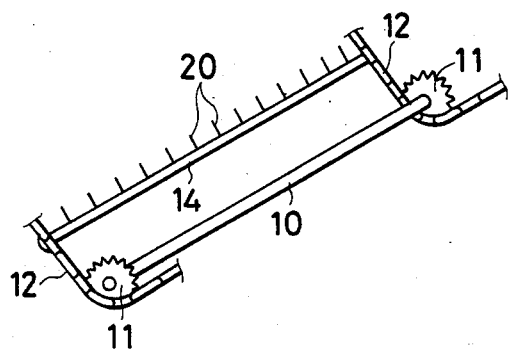
FIG. 5 is a perspective view of the main part of the weeder shown in FIG. 4.

FIGS. 4 and 5 show the main part of a weeder according to another embodiment of the present invention. Any other arrangement of the weeder (FIGS. 4 and 5) which is not illustrated in FIGS. 4 and 5 is the same as that in FIGS. 1 to 3.

A plurality of cutting blades are disposed in spaced relationship with each other along the axis of a core 14 of a weeding unit 4. Each blade 20 extends perpendicular to the axis of the core 14, with its tip 20a extending opposite to the direction which the chains 12 move. The cutting blades 20 are disposed so that the outer-most portion of each blade 20 is located inwardly of the top, the outer surface or the outer-most portion of the weed fetch rod 13, when moved rectilinearly.

Preferably, as shown in FIGS. 4 and 5, each blade 20 has a substantially triangular cross-sectional shape, and mounting pieces 35 are disposed close to and parallel with corresponding weed fetch rods 13. Each of the mounting pieces 35 has a length which is substantially the same as the distance between the two chains 12, and has a plurality of the cutting blades 20 at equal intervals to form a comb-like configuration. Each mounting piece 35 is connected to a cutting blade 20, and is attached to the chains 12 through plate-like protrusions which are integrally formed thereon, extending parallel to the chains 12. Each cutting blade 20 is positioned on the corresponding mounting piece 35 so that the cutting blade is just aligned with the outer marginal edge of the mounting piece 35. Further, the height of the mounting piece 35 is determined so that the outer edge of the blade 20 which assumes its outer-most position during non-rectilinear movement, is always arranged inwardly of the outer-most portion or the outer peripheral surface of the rod 13 when the mounting piece 35 moves rectilinearly together with the chains To secure the mounting piece 35 to the chains 12, plate-like protrusions forming opposite ends of the mounting piece 35 are superimposed on the outer surface of the chains 12, on which respective flat mounting portions 25 of the core 14 are placed. Subsequently, a washer 34 is placed on the inner surface of each chain 12. Finally, members 35, 12 and 25 are fixed together with a screw, not shown.

A washer 34, a flat mounting portion 25 of the core 14 and a bottom mounting piece 35 for the cutting blade 20 may be sequentially placed on a link piece 12a of the chain 12 and may be fastened with a bolt. See FIG. 6.

Figure 6:
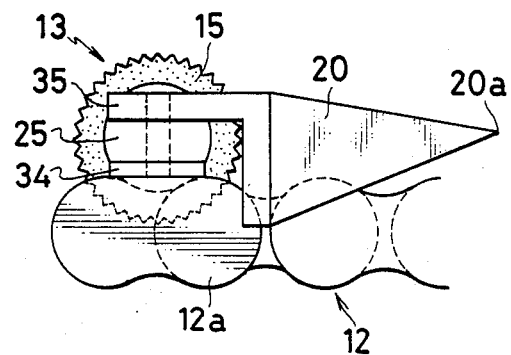
FIG. 6 is a side view of the main part of a weeder according to still another embodiment of the present invention.

The operation of the weeder, shown in FIGS. 4 and 6, is as follows: When the core 14 passes around the lowest chain gear 11 in the weeding unit 4, i.e. when motion of the core 14 changes from rectilinear motion to curved motion, the top 20a of each of the cutting blades 20, rotating in unison with the core 14 and forming the outer-most portion of the blade 20, projects outwardly from the top or the outer peripheral surface of the corresponding frictional member 15 mounted on the core 14. Weeds are aligned with each other between respective adjacent teeth of the comb-like blade 20 and then are cut by the blade 20 at their small underground roots. After the rod 13 passes around the lowest chain gears 11, the rod 13 is moved rectilinearly, i.e. the frictional member 15 is brought into forced contact with the flat belt 17, and the long leg of the triangular cutting blades 20 adjacent to the bottom side thereof extend parallel with the chain 12. As a result, the outer-most portion or the outer end of the bottom side of the blade 20, and consequently the whole portion of the blade 20, are inwardly located from the outer surface of the frictional member 15. Therefore, the cutting blades 20 cannot interfere with the frictional member 15 which operates to grip and pick up the weeds in cooperation with the belt 17 of the gripping unit 5.

What is claimed is:

1. A weeder comprising:
    a body movable along a ground surface;
    a weeding unit having a plurality of first rotatable members, a first winding transmission member having a substantial width and being looped around said plurality of first rotatable members, and weed fetch rods arranged on said first winding transmission member at predetermined intervals and movable in unison with said first winding transmission member;
    a drive unit for driving said first winding transmission member;
    a gripping unit provided next to said weeding unit transverse to a direction in which said body is moved, said gripping unit having a plurality of second rotatable members, and a second winding transmission member having a substantial width and being looped around said plurality of second rotatable members;

said first and second rotatable members including a lowest first rotatable member and a lower second rotatable member, respectively, which are operatively located in a plane extending substantially parallel to and in the vicinity of the ground surface and next to one another in a direction in which said body of said weeder is moved, so as to define a transverse lowest contact line between said weeding unit and said gripping unit as a start line of a contact start plane;

said first rotatable members including an upper rotatable member separated from said lowest first rotatable member in a vertical direction of said body, said first winding transmission member and said weed fetch rods movable in unison therewith and being rectilineraly movable between said lowest and upper first rotatable members;

said second rotatable members including an upper rotatable member separated from said lowest second rotatable member in a vertical direction of said body, said second winding transmission member being rectilinearly movable between said lowest and upper second rotatable members in parallel with said first winding transmission member, said second winding transmission having an outer surface provided so as to be in forced contact with said weed fetch rods; and said weed fetch rods having an outer peripheral surface; each of said weed fetch rods of said weeding unit carries a series of cutting blades arranged in a comb-like manner, the top of each of said cutting blades lying inwardly of the outermost portion of the outer peripheral surface of said each of said weed fetch rods when said each of said weed fetch rods is rectilinearly moved, and the top of said each of said cutting blades lying outwardly of the outermost portion of the outer peripheral surface of said each of said weed fetch rods when said each of said weed fetch rods is moved along an arcuated locus.

2. A weeder according to claim 1, wherein said first winding transmission member comprises a chain.

3. A weeder according to claim 1, further comprising a box which is mounted in said body and is adapted to store removed weeds.

4. A weeder according to claim 1, wherein said weeding unit includes a travel roller supported by said body, said travel roller being coupled to at least one of said first rotatable members to serve as said drive unit.

5. A weeder according to claim 1, wherein each of said weed fetch rods comprises a core and a plastic frictional member surrounding said core.

6. A weeder according to claim 5, wherein said frictional member comprises a cylinder having a plurality of ribs on an outer surface extending along a longitudinal direction thereof.

7. A weeder according to claim 1, wherein said second winding transmission member comprises a flat belt.

8. A weeder according to claim 1, wherein said gripping unit comprises a roller for changing a contact pressure between said second winding transmission member and said weed fetch rod.

9. A weeder comprising a body to be moved along a ground surface; a weeding unit arranged such that a first winding transmission member mounted on said body has weed fetch rods arranged at predetermined intervals, said weed fetch rods having a core and an outer peripheral surface; a drive unit for driving said first winding transmission member; and a gripping unit consisting of a second winding transmission member operatively brought into contact with said weed fetch rods of said weeding unit mounted on said body, wherein said weeding unit and said gripping unit are so arranged such that a lowest contact line between said weeding unit and said gripping unit is defined as a start line of a contact start plane, and the start lin is operatively located in the vicinity of the ground surface, each of said weed fetch rods of said weeding unit carries a series of cutting blades arranged in a comb-like manner, the top of each of said cutting blades lying inwardly of the outermost portion of the outer peripheral surface of said each of said weed fetch rods when said each of said weed fetch rods is rectilinearly moed, and the top of said each of said cutting blades lying outwardly of the outermost portion of the outer peripheral surface of said each of said weed fetch rods when said each of said weed fetch rods is moved along an arcuated locus.

10. A weeder according to claim 9, wherein said each of said cutting blades comprises a triangular blade whose bottom side is fixed on said core of said weed fetch rods.

11. A weeder according to claim 2, wherein said first rotatable members are composed of chain gears.

12. A weeder according to claim 7, wherein said second rotatable members are composed of rollers around which said flat belt is looped.

* * * * *